US007793234B1

(12) United States Patent
Ibbotson et al.

(10) Patent No.: US 7,793,234 B1
(45) Date of Patent: Sep. 7, 2010

(54) METHOD AND TOOL FOR GRAPHICALLY DEFINING AN EXPRESSION

(75) Inventors: John Bryan Ibbotson, Wilshire (GB); Michael Starkey, Vancouver (CA); Stephen James Paul Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1747 days.

(21) Appl. No.: 09/675,468

(22) Filed: Sep. 28, 2000

(30) Foreign Application Priority Data

Sep. 29, 1999 (GB) .................................. 9922920.5

(51) Int. Cl.
G06F 3/048 (2006.01)
G06F 17/30 (2006.01)
G06F 7/00 (2006.01)

(52) U.S. Cl. ........................ 715/853; 707/713; 707/759; 707/797

(58) Field of Classification Search ................. 345/968, 345/731, 760, 853, 763, 771, 855, 967; 707/4, 707/101, 102, 713, 759, 797; 717/105, 109, 717/144; 715/538, 853
See application file for complete search history.

(56) References Cited

U.S. PATENT DOCUMENTS

| 5,495,605 | A | * | 2/1996 | Cadot .............................. 707/4 |
| 5,555,367 | A | * | 9/1996 | Premerlani et al. .............. 707/4 |
| 5,668,966 | A | * | 9/1997 | Ono et al. ...................... 345/853 |
| 5,798,757 | A | * | 8/1998 | Smith .......................... 345/709 |
| 5,911,072 | A | | 6/1999 | Simonyi |
| 6,111,574 | A | * | 8/2000 | Meek .......................... 345/835 |
| 6,185,561 | B1 | * | 2/2001 | Balaban et al. ................. 707/6 |
| 6,243,858 | B1 | * | 6/2001 | Mizoguchi et al. .......... 717/107 |
| 6,346,945 | B1 | * | 2/2002 | Mansurov et al. ........... 345/473 |
| 6,377,953 | B1 | * | 4/2002 | Gawlick et al. ............. 707/102 |
| 6,434,545 | B1 | * | 8/2002 | MacLeod et al. ............... 707/3 |
| 6,476,833 | B1 | * | 11/2002 | Moshfeghi ................... 345/854 |
| 6,535,883 | B1 | * | 3/2003 | Lee et al. ..................... 707/100 |
| 6,687,692 | B1 | * | 2/2004 | Balaban et al. ................. 707/6 |
| 6,748,374 | B1 | * | 6/2004 | Madan et al. ................... 707/3 |
| 6,823,495 | B1 | * | 11/2004 | Vedula et al. ................ 715/805 |
| 6,829,770 | B1 | * | 12/2004 | Hinson et al. ............... 719/318 |

FOREIGN PATENT DOCUMENTS

| EP | 0491517 A2 | 12/1991 |
| EP | 0651325 A2 | 10/1994 |
| WO | WO 9506292 | 3/1995 |

* cited by examiner

*Primary Examiner*—Namitha Pillai
(74) *Attorney, Agent, or Firm*—Sawyer Law Group, P.C.

(57) ABSTRACT

A tool (30) for graphically defining an expression is disclosed. The tool comprises a graphic user interface (GUI) component (31) and an expression generator component (32) adapted to read a graphic definition of an expression provided by a user through the GUI component. The GUI component is responsive to user input to define one or more tree structures comprising a hierarchical series of nodes, and one or more lists comprising a plurality of items, each list item being associated with respective node of an associated tree. The expression generator component analyzes the graphic definition and generates an expression based on the structure of the or each tree and any list items associated with respective nodes of a tree.

14 Claims, 2 Drawing Sheets

METHOD AND TOOL FOR GRAPHICALLY DEFINING AN EXPRESSION

CROSS-REFERENCE TO RELATED PATENT APPLICATION

This application claims the benefit of European Patent Application No. 9922920.5, filed on Sep. 29, 1999, the entirety of which is incorporated herein by reference.

FIELD OF INVENTION

The present invention relates to a method and tool for graphically defining an expression, in particular, an expression for configuring a message broker, a relational message broker or an SQL3 database.

BACKGROUND OF THE INVENTION

It is becoming more and more common to combine messaging and queuing systems such as IBM's MQSeries™ with relational database systems, such as IBM's DB2 product or Microsoft's Access product (DB2 is a trademark of IBM Corp. while Access is a trademark of Microsoft Corp.) since relational databases are commonly used as a structured mechanism for storing and retrieving large quantities of related data.

For example, Sun Microsystems, Inc. have described (see European Patent Application No. 806,731, published 17 Nov. 1996) a messaging and queuing system used to carry out a publish/subscribe function. Servers act as publishers and publish messages while specifying a topic for each message. Clients act as subscribers and specify a topic on which they would like to receive messages. A messaging and queuing broker is placed in between the clients and servers and acts to distribute published messages to the appropriate clients. The system allows for a database to be provided as a publishing server so that a large quantity of structured data can be published to the network. The database could also be provided as a subscribing client, storing received published messages for easy and structured retrieval of a large quantity of messages. This system does not describe any further integration between the messaging and queuing system and the relational database system.

Oracle Corporation has taken this integration one step further with their Oracle8 Advanced Queuing (AQ) system ("Oracle8" and "Advanced Queuing" are trademarks of Oracle Corp.) by allowing a client application (subscriber) to submit a structured query to the messaging and queuing broker, in order to specify which published messages the subscriber wants to receive. The ability of a subscriber to use a standard database language, such as SQL (structured query language) to specify a topic of interest allows for a high-level of specificity in terms of expressing exactly what types of published messages the subscriber would like to receive. For example, the subscriber can use standard SQL query statements in order to specify that the subscriber would like to receive all published IBM stock quotes but only if the share price is greater than 100 United States dollars per share. In addition to using SQL statements, the subscriber can also take advantage of the various visual relational database programming techniques such as that provided by the Microsoft Access product in order to make it easier for the programmer to specify exactly what types of published messages the subscriber would like to see.

Open Horizon Corporation have taken this integration one step further still, with their Ambrosia 2.1 product (Ambrosia is a trademark of Open Horizon Corp.), by allowing a messaging and queuing broker to add subject matter to the contents of published messages before forwarding the messages on to requesting subscribers. The messaging and queuing broker receives a published message into an input queue. Like the Oracle product, standard SQL techniques are used to specify exactly which types of published messages a subscriber wants to see. However, the Ambrosia product goes further to collate the information in the published message with records stored in a relational database. Specifically, once a published message is received, some of the data from the database records is then added to the contents of the published message in order to create a published message with a more detailed contents, as compared to the published message that was originally received by the messaging and queuing broker. For example, if a published message specifying that IBM stock is now listing for 125 dollars per share is received at the broker's input queue, the broker could be programmed to retrieve information from a relational database, such information containing the identity of the customer (e.g., C23) and the amount of IBM stock which this customer presently owns (e.g., 225 shares). The retrieved information from the database is then combined with the published information to create a more detailed message that customer C23 owns 225 shares of IBM stock which is currently trading at 125 dollars per share, which is then forwarded to the customer C23 who has previously registered as a subscriber.

Active Software, Inc.'s ActiveWeb (a trademark of Active Software, Inc.) message broker product is similar to Open Horizon's Ambrosia product in that database content can be added to published messages to add value to the published message. ActiveWeb makes use of a specific piece of software code called a database adapter to perform the collation (e.g., join) operation. This adapter is required in order to extract data from the published messages, convert the data into a database query in the exact form that is expected by the database, retrieve data from the database and carry out the specific collation operation on the published messages and the database data.

In UK Patent Application No. 9809020.2 and corresponding U.S. application Ser. No. 08/165,945, a message broker for use in receiving messages from a sender application, processing the received messages and deciding which receiver application to forward the processed messages is disclosed. The broker comprises a filter node for receiving an incoming stream of messages from a sender application, with each message being arranged as a tuple having at least one field; a restructuring node for collating the incoming stream of messages with database data stored in a database, the database data being also arranged as tuples having at least one field; and a filter node for processing the stream of messages so that a resultant stream of messages becomes directed to at least one receiving application.

The prior art described above, however, has been largely designed to deal with messages where attribute values either within a message or within database relations comprise simple/atomic data types, for example, strings, integers, reals, dates etc. In such cases, it would be possible to use a graphical user interface tool, for example Query-by-Example (QBE), to allow a developer to formulate expressions for configuring either filters for incoming messages or database queries.

Using QBE, a user is provided with a columnar display with each column corresponding to field of one or more relations on which a query is to be performed. Below a column heading, which indicates the name of the field, the user can define expressions including setting attribute values including operators such as equal to, greater/less than or even ranges for selected fields. Furthermore, the user can also define graphically the format of the query output by setting out columns corresponding to the fields to appear in the output. A QBE analyzer then parses the graphic definitions to generate an SQL query.

Microsoft Access also provides such a graphical front end which allows a user to set attributes for relation fields and to determine which fields are to be included in the output, and again processes these settings to generate an SQL query.

However, SQL has been further developed into SQL3. SQL3 includes objects extensions where, in addition to the normal built-in types defined by SQL, user-defined types may also be defined. These types may be used in the same way as built-in types. For example, columns in relational tables may be defined as taking values of user-defined types, as well as built-in types. A user-defined abstract data type (ADT) definition encapsulates attributes and operations in a single entity. In SQL3, an abstract data type (ADT) is defined by specifying a set of declarations of the stored attributes that represent the value of the ADT, the operations that define the equality and ordering relationships of the ADT, and the operations that define the behaviour (and any virtual attributes) of the ADT. ADTs can also be defined as subtypes of other ADTs with subtypes inheriting the structure and behaviour of their supertypes (multiple inheritance is supported).

It can therefore be seen that because of the potential complexities of the data stored in SQL3 databases, it can be onerous for a developer to write an SQL3 query manually.

Furthermore, it has also become more common for messages to be written in Extended Mark-up language (XML). XML messages or documents are made up of storage units called entities, which contain either parsed or unparsed data. Parsed data is made up of characters, some of which form the character data in the document, and some of which form markup.

The function of the markup in an XML document is to describe its storage and logical structure and to associate attribute-value pairs with its logical structures. XML provides a mechanism, the document type declaration, to define constraints on the logical structure and to support the use of predefined storage units. A software module called an XML processor is used to read XML documents and provide access to their content and structure and also to access structures and generate XML documents from such structures. An XML processor typically works on behalf of another module, called the application.

It can therefore been seen that it can again be onerous for developers to define filters, when such an application is used to filter messages including complex structures before they are passed on either via a relational database as mentioned above or directly, for example, to a subscriber in a publish/subscribe network.

Clearly, for the complex types of either XML messages or SQL3 based databases, the graphical front end provided by QBE is not suitable, as it only allows users to define values for simple data types.

It is conceded that is known to view hierarchical structures, such as those of an XML document, using a tree view. However, such viewers do not easily allow a developer to define message filters or database queries or the complex join statements that are required for linking the incoming messages of a relational message broker with its potentially SQL3 based database.

DISCLOSURE OF THE INVENTION

Accordingly, the present invention provides a tool in a computer system, a method, and a computer readable medium, for grahpically defining an expression, said tool comprising a graphical user interface (GUI) component and an expression generator component adapted to read a graphic definition of an expression provided by a user through said GUI component,
  said GUI component comprising:
    means, responsive to user input, for defining one or more tree structures comprising a hierarchical series of nodes, and one or more lists comprising a plurality of items, each list item being associated with respective node of an associated tree;
    said expression generator component comprising:
    means for analyzing said graphic definition and generating an expression based on the structure of the or each tree and any list items associated with respective nodes of a tree.

The invention can be used to program the specifics of how a stream of complex data should be filtered or collated (e.g., merged or joined) with data from a database including complex data types or to formulate queries on the database and this greatly facilitates programming.

BRIEF DESCRIPTION OF THE DRAWINGS

A preferred embodiment of the present invention will now be described making reference to the following drawing figures.

DESCRIPTION OF THE PREFERRED EMBODIMENTS

Figure 1:
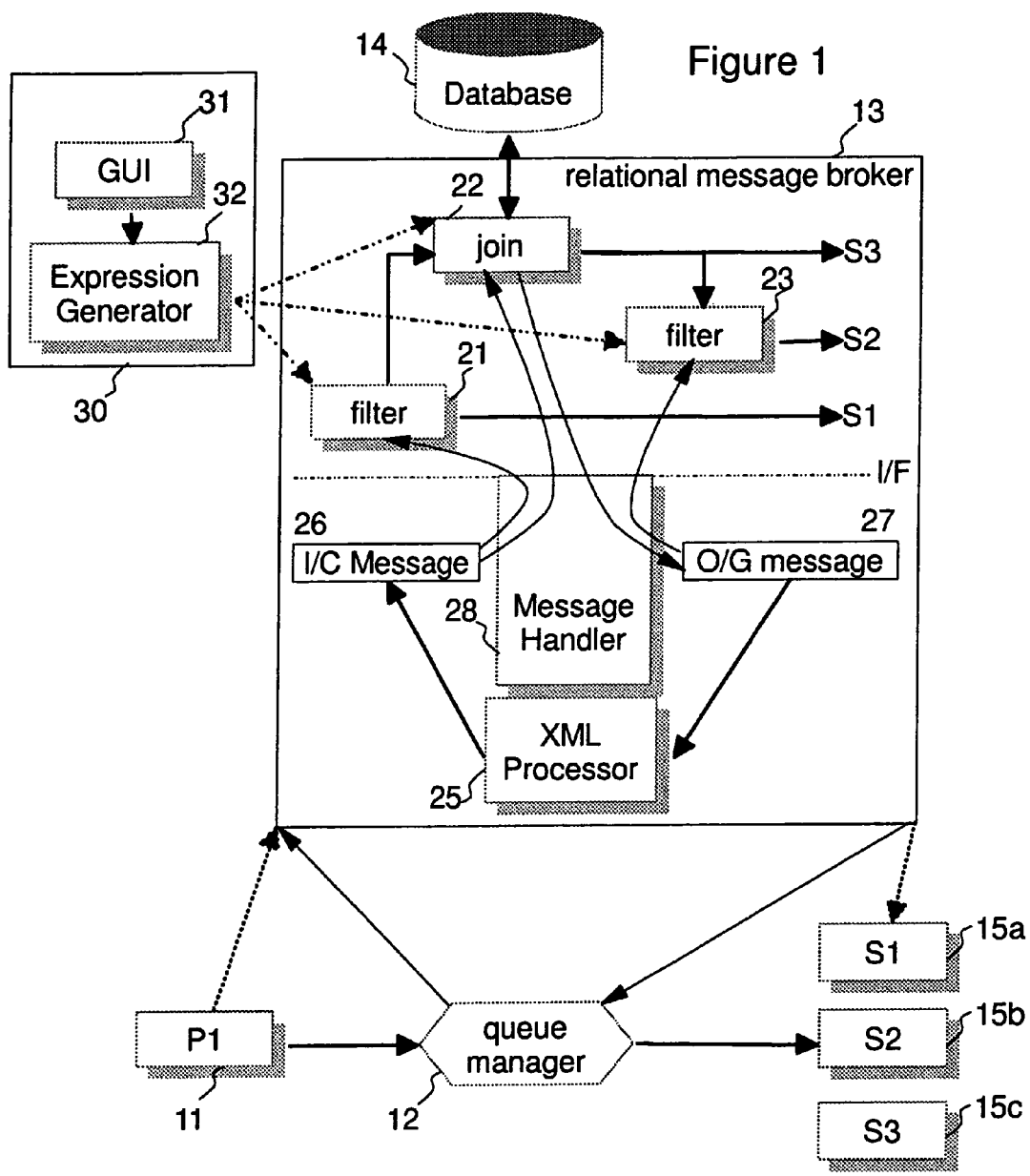
FIG. 1 is a block diagram showing a relational message broker.

In FIG. 1, a publisher data processing unit 11 is provided for supplying live up-to-the-minute data which subscribers would like to receive. In the preferred embodiment, a publisher application P1 (11) sends a stream of published messages to a messaging and queuing unit such as IBM's MQSeries product (shown as queue manager 12). This queue manager's message transmission protocol and the associated transactional concepts and recovery facilities are well known and are described in PCT application WO 95/10805 and U.S. Pat. No. 5,465,328. The queue manager 12 forwards the stream on to a relational message broker 13 for processing and assignment of messages to particular subscribers, after which the stream of messages is sent back to the queue manager 12 for transmittal to three subscriber applications S1 (15a), S2 (15b) and S3 (15c).

The relational message broker 13 is arranged as a set of processing nodes 21, 22 and 23 interconnected to form a network. These processing nodes could be all located on the same data processing machine or they may be distributed over a plurality of interconnected data processing machines.

In the preferred embodiment, the processing functionality of each node is defined by an SQL3 relational expression. This relational expression is provided by a configuration tool 30. The configuration tool preferably includes two components a GUI 31 and an expression generator 32 which reads a configuration provided by a user through the GUI and generates an SQL3 expression from this configuration. The SQL3 expression is then forwarded via any conventional inter-process communication mechanism to one of nodes 21, 22, 23 selected by the user and the node operates accordingly.

The operation of the tool 30 will be described by way of example, where in the preferred embodiment, published messages are sent from the publisher 11 in the form of n XML messages. For example, Table 1 shows a sequence of two such messages containing only simple data types:

TABLE 1

(sample messages in a message stream)

| Company | Price |
|---------|-------|
| IBM     | 160   |
| Ford    | 44    |

It will be seen that, using XML, messages can be defined to include both optional and complex data types. For example, messages transmitted by various publishers may include an optional history field containing sub-fields such as daily_low and daily_high, prev_close, opening, volume, last_trade which may in turn including sub-fields an amount and a time sub-field.

In the preferred embodiment, such incoming messages are read by an XML processor 25 which stores the data in a structure 26 for later access by the nodes of the broker via a message handler 28. The processor 25 can in turn be called by the broker to build XML messages from supplied structures. It should be seen, however, that the invention is not limited to configuring filters for XML messages, rather that it is useful in any cases where a filter for messages including complex data types, for example, C structures, needs to be configured.

Once inside the broker 13, each message in the stream of published messages is first subjected to processing by a filter node 21 which filters out (discards) some of the published messages, only allowing certain messages to pass through the filter. In the example, the stream of published stock quotes from P1 generally involves stock quotes from a very large number of companies. Perhaps the subscribers S1, S2 and S3 are only interested in stocks from IBM and Ford whose price is rising.

The processing functionality of the filter node 21 is defined using, for example, the SQL3 SELECT statement, to express exactly which messages will be allowed to pass through the filter. Thus, the filter node 21 allows messages to pass through the filter based on the following expression:

SELECT IN where (IN.company="IBM" or IN.company="Ford") and IN.history.last_trade.amount>IN.history.prev_close by no means a simple expression to write manually, and this is only a relatively simple filter configuration.

The output of the filter 21 is connected to the input of a join operator 22 which takes the filtered message stream (which involves only rising IBM and Ford stock quotes) as a first input. The join node 22 receives a second input from a SQL3 database 14. When the join node 22 receives published messages from the output of filter node 21, appropriate database tuples are accessed and read out of the database 14 for joining with the published messages. The node 22 thus creates a more meaningful message which can then be sent to the subscriber.

In SQL3 databases, data stored in a database is organized into rows called "tuples", although any field of a tuple may include a complex data type such as the Stake field in the example of Table 2 below which shows three tuples:

TABLE 2

(sample of data stored in database)

| Customer | Stake | | |
|----------|---------|----------|----------------|
|          | Company | Quantity | Purchase_Price |
| C3       | IBM     | 77       | 100            |
| C2       | IBM     | 44       | 90             |
| C3       | Ford    | 120      | 55             |

In this case, the Stake field includes sub-fields: Company, Quantity and Purchase_Price. The customer field could also be a complex user defined type including more detailed user information. For example, customer could comprise a structure including an identifier as above, a name field, which in turn includes first and last sub-fields, and an address field which includes street, town and county fields and this structure will be used later to illustrate the possible configurations that can be generated by the tool according to the invention. For the moment, it should be seen that even to represent such a structure in the columnar format of Table 2, the same format used by QBE, could be quite complex. (For the purposes of the present description the identifiers C1, C2, and C3 will be used to identify respective customers.)

Using the examples above, a published message indicates that the IBM share price has risen to 160 US dollars per share, and a database record stored in database 14 includes a complex Stake field indicating that a particular customer having an identifier of C3 owns 77 shares of IBM stock purchased at 100 US dollars.

The processing functionality of the join node 22 is again defined by a relational expression using, for example, the SQL3 INNER JOIN statement, to express exactly how the message stream is joined with the database data. For example, the following statement:

SELECT In.Company, In.Price, Customerstock.Customer, Customerstock.Stake.Quantity,
Customerstock.Stake.Price
FROM In INNER JOIN Customerstock
ON In.Company=Customerstock.Stake.Company;

can be used to generate an output including both the purchase price and the number of shares owned by a customer.

The join operation performed by the node 22 produces a message longer than the published message which indicates that customer C3 owns 77 shares of IBM stock purchased at 100 US dollars which is now worth 160 US dollars per share. In the preferred embodiment, such outgoing messages are stored in a structure 27, referred to in configuration expressions as OUT, for later access by the message broker via the message handler 28.

For example, using the database data of Table 2, when a first published message (shown in the first line of Table 1), which states that an IBM share price which is now 160 US dollars per share and which we will assume is rising is received by the broker 13, it passes through the filter node 21, since the relational expression defining this node allows messages to pass if they involve rising IBM or Ford share prices. When this message reaches the join node 22, the join node performs a collation of this message and the tuple shown in the first line of Table 2 to provide a longer message as shown in the first line of Table 3 (which indicates that customer C3 has 77 shares of IBM stock, purchased at 100 US dollars and currently worth 160 US dollars per share).

TABLE 3

(sample messages in a message stream at the output of join node)

| Company | Price | Customer | Quantity | Purchase_Price |
|---------|-------|----------|----------|----------------|
| IBM     | 160   | C3       | 77       | 100            |
| IBM     | 160   | C2       | 44       | 90             |
| Ford    | 44    | C3       | 120      | 55             |

As shown in FIG. 1, the output of join node 22 is sent directly to the queue manager 12 for inclusion in S3's queue. Subscriber S3 (15c) thus retrieves the messages from the queue whenever the subscriber S3 is ready to retrieve information. According to the node structure of FIG. 1, S3 will receive messages concerning all customers that own IBM or Ford stock. S3 is, for example, an auditor who wishes to obtain stock ownership data concerning all customers.

The message shown in the first line of Table 1 will also be joined at the join node 22 with the database tuple shown in the second line of Table 2, resulting in a longer message as shown in the second line of Table 3 (which indicates that customer C2 has 44 shares of IBM stock that is currently worth 160 US dollars per share). This message is again sent directly to the queue manager 12 for inclusion in S3's queue.

The output of join node 22 is also sent via a filter node 23 to queue manager 12 for inclusion in S2's queue. Filter node 23 is again configured using a relational expression to pass through only messages that relate to customer C2. Again, an SQL3 SELECT statement is used to express exactly which messages will be allowed to pass through the filter 23:

SELECT IN where (IN.customer="C2")

The message shown in the second line of Table 3 does relate to C2 and thus will pass through the filter node 23 to be sent to queue manager 12 for inclusion in S2's queue. Subscriber S2 (15b) then retrieves the messages from the queue whenever the subscriber S2 is ready to retrieve information.

When a second published message (as shown in the second line of Table 1) reaches the filter node 21, it will be allowed to pass through the filter node 21 since the message relates to Ford share prices (specifically, this message states that the current Ford share price is now 44 US dollars per share). Once through the filter node 21, this message makes its way to the join node 22, where it is joined with the database tuple shown in the third line of Table 2 (since this is the only database tuple that involves Ford) to provide a longer message as shown in the third line of Table 3 (which indicates that customer C3 has 120 shares of Ford stock that is currently worth 44 US dollars per share). This message output from this join node 22 is then sent to the queue manager 12 for inclusion in S3's queue. Because this message involves customer C3, however, it is not allowed to pass through filter node 23, since filter node 23 only allows messages to pass if they involve customer C2.

Assume that subscriber S1 is very interested in IBM and Ford stock but has not bought any shares in either company and does not plan on buying any. For example, assume S1 is a financial agent that makes business decisions based on the current share price of IBM and Ford stock. In this case, there is no need to involve the join or filter nodes 22, 23 since the database 14 does not contain any information that is desirable to S1. Thus, a second output is provided to filter node 21 and all published messages which the filter node 21 allows to pass (stock prices concerning IBM and Ford share prices) are output from this second output. The messages are then passed to the queue manager 12 for inclusion in S1's queue. Subscriber S1 (15a) then retrieves the messages from the queue whenever the subscriber S1 is ready to retrieve information.

Thus, the functionality of each node 21, 22, 23 of the broker 13 is defined using respective relational expressions, expressed in a standard relational language, such as SQL3. The output of the relational expression of one node is a steam of messages which is provided as an input to a relational expression of an adjacent node. The filter nodes 21 and 23 use the common SELECT function of database relational algebra, whereas the join node 22 uses the common INNER JOIN function of database relational algebra. While the collation that takes place between the database 14 and the published messages has been described in detail as the "join" operation, many other relational algebraic operations can also be implemented in order to collate the database data with the published messages, such as the "intersection", "compute" or "union" operations.

Figure 2:
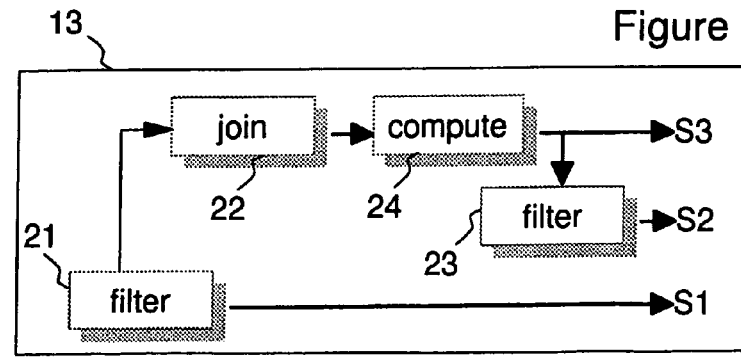
FIG. 2 is a block diagram showing a modified version of the relational message broker of FIG. 1.

Once the broker system has been configured using any combination of expressions generated by the tool 30, it is very easy to make changes to add additional functionality. For example, a compute node 24 (as shown in FIG. 2) could be added at the output of the join node 22 so that the resultant message would include another field that is the total profit for each customer's share ownership in the relevant company. That is, the compute node 24 would multiply the difference between the purchase price and the share price by the number of shares a customer has and provide the product in a separate field (called "Total Profit"). Thus, Table 3 would now become:

TABLE 4

| Company | Price | Customer | Quantity | Total Profit |
|---------|-------|----------|----------|--------------|
| IBM     | 160   | C3       | 77       |              |
| IBM     | 160   | C2       | 44       |              |
| Ford    | 44    | C3       | 120      |              |

The configuration tool 30 according to the invention enables a developer to graphically define expressions for configuring any node 21 . . . 24 of the relational message broker. Furthermore, the invention can be used to graphically define filters and restructuring in more conventional message brokers as well as queries in SQL3 database systems.

The invention enables a developer to graphically define an expression using a tree view representing any complex data structure. Each input or output structure is represented by a respective tree comprising a hierarchical series of leaf and branch nodes. Branch nodes represent complex structured fields, while leaf nodes represent the lowest level atomic fields, such as strings or integers etc.

Displayed in association with each tree is a list. Each list item is associated with a node of the tree. For an input tree, list items define filtering constraints, whereas, for an output tree, list items comprise formatting definitions. Preferably, the list for an output tree is displayed to the left of the tree so emphasising a 'left right' data movement, through a node.

In the following examples, In and Out correspond with messages stored in locations 26, 27 where the tool 30 is used in conjunction with a message broker, although they can be thought of as database tables where the tool is used to generate queries for SQL3 databases. DB on the other hand is specifically used to indicate a table such as the database table 14. In the simplest case, illustrated in Tree #1 below, a tree defines a single input, and an output of the same format but filtered on certain data. In the examples below an address structure of the type defined for Customer above is used. The filter may be expressed as the AND of nodes within the tree for which an expression is provided in the associated list item.

In the preferred embodiment an '=' is used to illustrate the link between a node and its corresponding list item, whereas it will be seen that this can be made implicit.

Tree #1

| TREE | LIST |
|---|---|
| - In | |
| \| - - - Name | |
| \| \| - - - First | ="Stephen" |
| \| ' - - - Last | |
| ' - - - - Address | |
| \| - - - Street | |
| \| - - - Town | ="Winchester" |
| ' - - - County | |

Once the user has completed such a tree definition using the GUI 31, it is passed to the expression generator 32. The expression generator operates in a manner similar to conventional compilers being logically divided into a scanner, a parser and the actual expression generator. The scanner breaks the graphical definition provided by the user into tokens placed on a stack for later parsing, preferably one tree and its associated list at a time. The tokens include indicators of the level of indentation of a node within the hierarchy. At each line of the tree, the scanner detects whether or not a node has a non-null associated list item and these too are placed on a token stack. The parser, using a grammatical definition for the GUI, then reads the token stack and either in the same pass over the token stack or a separate pass, the expression generator produces an expression.

In the example of Tree #1, the expression generator generates the following statement:

SELECT *
FROM In
WHERE In.Name.First="Stephen" AND In.Address.Town="Winchester"

Restructuring on the other hand requires the developer to define both an input and an output tree.

Figure 3:
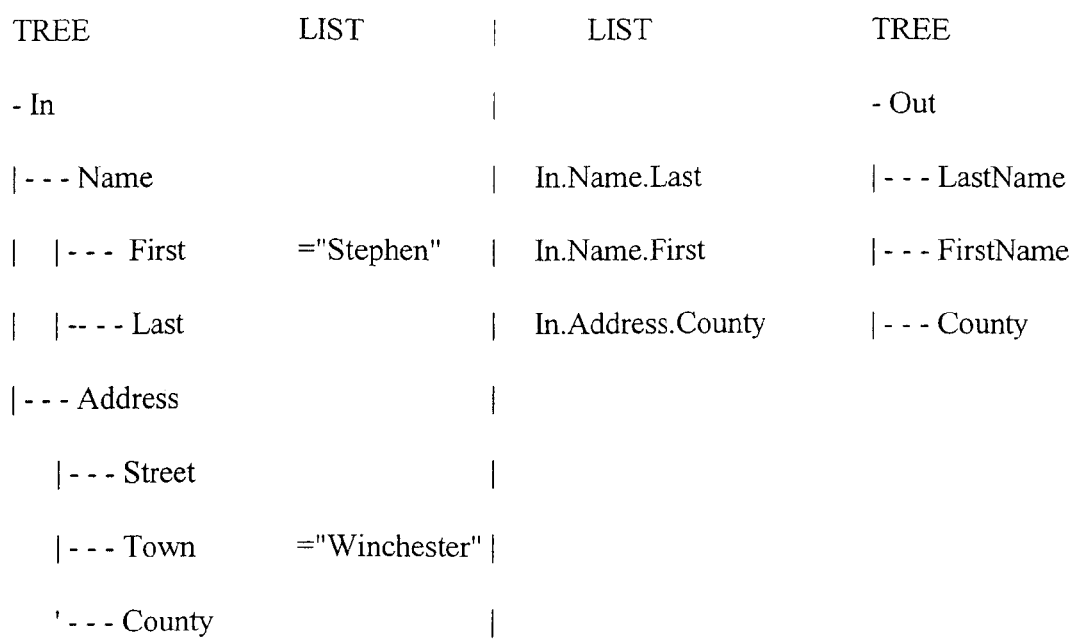
FIG. 3 is an exemplary tree structure according to a preferred embodiment of the present invention.

FIG. 3 illustrates an exemplary tree structure according to an embodiment of the present invention. In this embodiment, the tree structure (Tree #2) applies a filter and performs a restructure.

The expression generator generates the following expression:

SELECT In.Name.Last AS LastName, In.Name.First AS FirstName, In.Address.County AS County
FROM In
WHERE In.Name.First="Stephen" AND In.Address.Town
="Winchester"

Where such an expression is applied to a message filter, it would pass on only the complete name and county fields and only from messages relating to people living in Winchester whose first name was Stephen.

To configure a node such as the join node 22 used in the relational message broker or simply to generate a join query for a stand alone database, an input tree is provided for each input message or table, as shown in the example of Tree #3.

Tree #3

| TREE | LIST | \| LIST | TREE |
|---|---|---|---|
| - In | | \| | - Out |
| \| - - - Name | | \| In.Name.Last | \| - - - |
| LastName | | | |
| \| \| - - - First | ="Stephen" | \| In.Name.First | \| - - - |
| First Name | | | |
| \| ' - - - - Last | | \| In.Address.County | \| - - - County |
| ' - - - Address | | \| DB.Country | ' - - - Country |
| \| - - - Street | | \| | |
| \| - - - Town | ="Winchester" | \| | |
| ' - - - County | | \| | |
| - DB | | | |
| \| - - - County | =In.Address.County | | |
| ' - - - Country | | | |

In the example of Tree #3, the expression generator generates the following expression:

SELECT In.Name.Last AS LastName, In.Name.First AS FirstName,
In.Address.County AS County, DB.Country AS Country
FROM In INNERJOIN DB
ON DB.County=In.Address.County
WHERE In.Name.First="Stephen" AND In.Address.Town="Winchester"

Here the input message IN is to be joined on its In.Address.County field with the county field of the database table DB. This enables the output tree to include the Country field supplied by the database table.

It does not matter whether =In.Address.County is used against DB.County, or =DB.County is used against In.Address.County as the join operation is symmetrical.

It will also be seen that the GUI enables a user to specify the output structure in a complex format. Thus, while in the example of Table 3 above, output messages only comprised fields with simple data types, the tool can be used to more readily define complex output structures which are in turn more readily convertible into complex XML messages by a suitable processor 25.

Preferably, the expression generator 32 is adapted to interpret 'free variables', corresponding to QBE 'examples'. In Tree #4, Var1, Var2 and Scotland are not in quotes and so they are interpreted by the expression generator 32 as 'variables' or 'examples'.

Tree #4

| TREE | LIST | \| LIST | TREE |
|---|---|---|---|
| - In | | \| | - Out |
| \| - - - Name | | \| Var1 | \| - - - |
| LastName | | | |
| \| \| - - - First | ="Stephen" | \| "Stephen" | \| - - - |
| FirstName | | | |
| \| ' - - - Last | =Var1 | \| Var2 | \| - - - County |
| ' - - - Address | | \| Scotland | ' - - - Country |
| \| - - - Street | | \| | |
| \| - - - Town | ="Winchester" | \| | |
| ' - - - County | =Var2 | | |
| -DB | | | |
| \| - - - County | =Var2 | | |
| ' - - - Country | =Scotland | | |

In the example of Tree #4, the expression generator generates the following expression:
SELECT In.Name.Last AS LastName, In.Name.First AS FirstName,
In.Address.County AS County, DB.Country AS Country
FROM In INNERJOIN DB
ON DB.County=In.Address.County
WHERE In.Name.First="Stephen" AND In.Address.Town="Winchester"

and this could again be used to configure the join node 22.

Thus, Var1 is taken to represent In.Name.Last and Var2 is used to join the two tables as it links both In.Address.County and DB.County. Both variables are used in the output tree to map input fields to the fields of the output message. As in QBE, variables may be given more exemplary names, as in the case of Scotland, which is used to represent DB.country.

Comparisons and linking is not restricted to leaf nodes, it is also possible to use branch node designations to assign complete structures in one step, as shown in. Tree #5.

Tree #5

| TREE | LIST | | LIST | TREE |
|---|---|---|---|---|
| - In | | | | - Out |
| \|--- Name | | | In.Name | \|--- Name |
| \|  \|--- First | ="Stephen" | | | \|  \|--- First |
| \|  '--- Last | Var1 | | | \|  '--- Last |
| '--- Address | | | Var2 | '--- County |
|   \|--- Street | | | | |
|   \|--- Town | ="Winchester" | | | |
|   '--- County | =Var2 | | | |

In the case of Tree #5, the expression generator generates the following statement:
SELECT In.Name AS Name, In.Address.County AS County
FROM In
WHERE In.Name.First="Stephen" AND In.Address.Town
="Winchester"

In this case, In.Name, a complex structure including First and last sub-fields is used to map the In.Name field to a corresponding structure in the output tree. It should be seen that the node names of the output tree need not correspond with those of the input tree, but they should be of compatible type for a meaningful expression to be generated. While not within the scope of the present description, the expression generator 32 could be also be equipped with a semantic analyzer to carry out full type checking.

Sub-structures can also be associated with free variables as illustrated in Tree #6.

Tree #6

| TREE | LIST | | LIST | TREE |
|---|---|---|---|---|
| - In | | | | - Out |
| \|--- Name | MyName | | MyName | \|--- Name |
| \|  \|--- First | ="Stephen" | | | \|  \|--- First |
| \|  '--- Last | Var1 | | | \|  '--- Last |
| '--- Address | | | Var2 | '--- County |
|   \|--- Street | | | | |
|   \|--- Town | ="Winchester" | | | |
|   '--- County | =Var2 | | | |

In this case, the expression generator generates the expression:
SELECT In.Name AS Name, In.Address.County AS County
FROM In
WHERE In.Name.First="Stephen" AND In.Address.Town
="Winchester"

MyName now represents a structure of the same type as In.Name, and is used to map this structure to the output structure Out.Name.

Tree #7 shows a list item comprising a complex expression including a variable and a function based on a variable:

Tree #7

| TREE | LIST | LIST | TREE |
|---|---|---|---|
| - - in | | | - - out |
| \|-- Title | Var1 | | |
| \|--- Name | Var2 | Var1 + ucase(Var2) | \|--- Name |
| \|--- Address | Var3 | ucase(Var3) | \|--- Address |

Here an expression is generated which would turn turn the following message:
<title>Mrs</title><name>Todd</name><address>Winchester</address> into
<name>MrsTODD</name><address>WINCHESTER</Address>

While the above examples, have illustrated AND type queries, OR queries can be posed in one of two ways:

The developer first generates the tree view and in association with the view writes an expression explicitly either in a separate area, as in the case of Tree #8, under the tree or in a pop-up window.

Tree #8

| TREE | LIST |
|---|---|
| - In | |
| \|--- Name | |
| \|  \|--- First | |
| \|  '--- Last | |
| '--- Address | |
|   \|--- Street | |
|   \|--- Town | |
|   '--- County | |

(In.Name.First="Stephen" AND
In.Address.Town="Winchester") OR
In.Name.Last="Smith"

This of course lessens the benefit of using a completely graphic and intuitive interface.

Thus, in an alternative embodiment, OR expressions are generated by associating more than one item list with a tree, as in the case of Tree #9.

| Tree # 9 | | |
| --- | --- | --- |
| | LIST | |
| TREE | col1 | col2 |
| - In | | |
| | - - - Name | | |
| |  | - - - First | ="Stephen" | |
| |  '- - - Last | | ="Smith" |
| '- - - Address | | |
|    | - - - Street | | |
|    | - - - Town | ="Winchester" | |
|    '- - - County | | | with the expression generator generating the following expression:

SELECT *
FROM In
WHERE (In.Name.First="Stephen" AND In.Address.Town="Winchester") OR In.Name.Last="Smith"

In any case, if the developer wishes to filter on several possibilities for the same attribute, then the associated list item expression can simply be written to include the OR explicitly, for example:

--- Company="IBM" or "Ford"

will generate the WHERE clause:

WHERE Company="IBM" OR Company="Ford"

A further feature of the GUI 31 is that the developer can link input fields with lines to indicate equality testing. Furthermore, lines from input to output fields can be used to indicate simple transfer of data.

In a database with a rigid schema it is possible to enumerate all fields of a query at design time. This is not possible in a message area, particularly when XML messages are employed as the data type is likely to be more dynamic. In the example above, messages with stock prices may or may not include a history field. In the case of address information, some addresses may only include one or 2 address lines, UK addresses may have a Post code field whereas US addresses may have a ZIP code field.

To take this into account, 'optional' fields can be indicated by a wildcard symbol and in the present embodiment, this comprises ' . . . '.

Thus, to copy all fields in a message, and to add a timestamp field, a tree such as Tree #10 can be used.

| Tree #10 | | | |
| --- | --- | --- | --- |
| TREE | LIST | LIST | TREE |
| - In | | | - Out |
| '- - - . . . | =etc | Time( ) | | - - - Time |
| | | etc | '- - - . . . |

In this case, the expression generator generates the expression:

SELECT Time( ) as TIME, In.*
FROM In and such an expression could usefully be used to configure the compute node 24.

The wildcard symbol can also be used to copy all fields EXCEPT those explicitly named, by associating the symbol with the remainder of the structure, as in the case of Tree #11.

| Tree #11 | | | | |
| --- | --- | --- | --- | --- |
| TREE | LIST | | | LIST | TREE |
| - In | | | | | - Out |
| | - - - Name | | | | Etc1 | | - - - Name |
| |  | - - - First | | | | Etc2 | '- - - . . . |
| |  '- - - . . . | Etc1 | | | | |
| '. . . | Etc2 | | | | |

In this case, the expression generator generates the expression:

SELECT In.Name.Last AS Name, In.Address AS Address
FROM In

The variable Etc1 represents all the fields of Name except Name.First. Etc2 represents all top level fields of In except Name.

In order to generate this SQL expression, the expression generator required a knowledge of the fields available in In. The equivalent information will not always be available at expression generation time for messages with a freer structure. In this case the language generated by the expression generator needs extension to include an equivalent to the ' . . . ' semantics.

A common use of filters is to check that an input message ONLY has specified fields, say A and B. Tree #12 shows how the configuration for such a filter would be graphically defined:

| Tree #12 |
| --- |
| TREE |
| - In |
| | - - - A |
| '- - - B |

Such a filter would detect messages not conforming to such a grammar and discard them, thus preventing say bottleneck compute nodes from receiving messages they could never process.

SQL assumes knowledge of the structure of the input In at expression generation time, and so does not have any syntax to represent run time constraints based on the presence of fields.

Wildcard symbols, however, can also be used to configure a filter to check that an input message has at least fields A and B, as shown in Tree #13.

| Tree #13 |
| --- |
| TREE |
| - In |
| | - - - A |
| | - - - B |
| '- - - . . . |

It will be seen that the wildcard symbol may be used within substructures as well as at the top level. In every case, it indicates all fields not explicitly mentioned at a particular level of the structure.

Thus, it will be seen that changes to existing nodes (e.g., 22) can be easily made by modifying the graphical definition which configures the functionality of the node. In the case of the relational message broker, the nodes 21 . . . 24 are all seamlessly integrated into a network of interconnected nodes with streams of messages being passed between the nodes, and so the graphical definitions which in turn are used to generate a relational expression for a node can be easily modified in a uniform fashion. There is no need to have to switch to a different type of programming for any of the nodes.

Thus, developers will find it easy to set up the structure of the nodes (e.g., 21, 22, 23, 24) of the broker 13. For example, if, due to a customer request, a change must be made to a join node, this can easily be carried out by the developer without having to learn a programming language, thus greatly reducing the system development expense.

While each of the nodes are defined by expressions generated by the tool in the preferred embodiment, some of the nodes may be implemented in other ways, but of course the benefits are reduced in such a case.

It should also be noted that while the broker 13 has been described in relation to the queue manager 12, the broker 13 can also be used in a synchronous mode of operation, bypassing the queue manager 12, as shown by the dotted lines in FIG. 1. This would, for example, involve a system where the publisher and subscriber are always operational, thus doing away with the need for the functions of the queue manager 12.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

What is claimed is:

1. A tool in a computer system for graphically defining an expression, the tool comprising:
    a graphical user interface component operable to create a graphical definition of the expression based on one or more tree structures, each of the one or more tree structures comprising a plurality of nodes and being associated with one or more lists, wherein each of the one or more lists comprises a plurality of items, each of the plurality of items being associated with a node of the tree structure associated with the respective list; and
    an expression generator component coupled in communication to the graphical user interface component, the expression generator component being operable to generate the expression based on the graphical definition created by the graphical user interface component, wherein the expression is adapted to filter or modify one or more messages published by a publisher application prior to delivery of the one or more messages to one or more subscriber applications, the expression being adapted to modify at least one of the one or more messages by merging data from one or more databases into the at least one message.

2. The tool of claim 1, wherein the expression is adapted to modify at least one of the one or more messages by performing one or more computations on data within the at least one message.

3. The tool of claim 1, wherein the graphical definition of the expression is created based on at least one input data tree structure and at least one output data tree structure, wherein at least one item in the one or more lists associated with the at least one input data tree structure specifies a filtering constraint, and wherein at least one item in the one or more lists associated with the at least one output data tree structure specifies a formatting definition.

4. The tool of claim 3, wherein at least one other item in the one or more lists associated with the at least one output data tree structure identifies a node of the at least one input data tree structure.

5. The tool of claim 1, wherein the expression is a structured query language statement.

6. The tool of claim 1, wherein the one or more messages published by the publisher application are in XML format.

7. The tool of claim 1, wherein at least one item in the one or more lists associated with one of the one or more tree structures comprises a free variable or a wildcard symbol.

8. The tool of claim 1, wherein at least one of the plurality of nodes in the one or more tree structures is a branch node representing a complex data structure field and at least another of the plurality of nodes in the one or more tree structures is a leaf node representing a simple data structure field, the simple data structure field comprising one of a string, an integer, a real number, and a date.

9. The tool of claim 1, wherein the graphical definition of the expression is created based on at least two input data tree structures and wherein at least one item in the one or more lists associated with a first of the at least two input data tree structures identifies a node of a second of the at least two input data tree structures.

10. The tool of claim 1, wherein at least one of the one or more tree structures is associated with two or more lists and wherein at least one item from a first of the two or more lists and at least one item from a second of the two or more lists are part of a logical statement in the expression.

11. A computer-implemented method for graphically defining an expression, the method comprising:
    creating a graphical definition of the expression based on one or more tree structures,
    each of the one or more tree structures comprising a plurality of nodes and being associated with one or more lists, wherein each of the one or more lists comprises a plurality of items, each of the plurality of items being associated with a node of the tree structure associated with the respective list; and
    generating the expression based on the created graphical definition, wherein the expression is adapted to filter or modify one or more messages published by a publisher application prior to delivery of the one or more messages to one or more subscriber applications, the expression being adapted to modify at least one of the one or more messages by merging data from one or more databases into the at least one message.

12. The method of claim 11, wherein the graphical definition of the expression is created based on at least one input data tree structure and at least one output data tree structure, wherein at least one item in the one or more lists associated with the at least one input data tree structure specifies a filtering constraint, and wherein at least one item in the one or more lists associated with the at least one output data tree structure specifies a formatting definition.

13. A computer system for graphically defining an expression, the system comprising:

means, within the computer system, for creating a graphical definition of the expression based on one or more tree structures, each of the one or more tree structures comprising a plurality of nodes and being associated with one or more lists, wherein each of the one or more lists comprises a plurality of items, each of the plurality of items being associated with a node of the tree structure associated with the respective list; and means, within the computer system and coupled in communication with the means for creating, for generating the expression based on the created graphical definition, wherein the expression is adapted to filter or modify one or more messages published by a publisher application prior to delivery of the one or more messages to one or more subscriber applications, the expression being adapted to modify at least one of the one or more messages by merging data from one or more databases into the at least one message.

14. The system of claim 13, wherein the graphical definition of the expression is created based on at least one input data tree structure and at least one output data tree structure, wherein at least one item in the one or more lists associated with the at least one input data tree structure specifies a filtering constraint, and wherein at least one item in the one or more lists associated with the at least one output data tree structure specifies a formatting definition.

* * * * *